United States Patent [19]

Nakasuji et al.

[11] 4,028,118

[45] June 7, 1977

[54] THERMOCHROMIC MATERIALS

[75] Inventors: Norikazu Nakasuji; Takashi Kataoka; Hiroshi Inagaki; Sunao Nakashima, all of Nagoya, Japan

[73] Assignee: Pilot Ink Co., Ltd., Nagoya, Japan

[22] Filed: Dec. 23, 1975

[21] Appl. No.: 643,656

Related U.S. Application Data

[63] Continuation-in-part of Ser. No. 365,330, May 30, 1973, abandoned.

[30] Foreign Application Priority Data

| May 30, 1972 | Japan | 47-53649 |
| July 27, 1972 | Japan | 47-75355 |
| July 29, 1972 | Japan | 47-76132 |
| Sept. 14, 1972 | Japan | 47-92378 |
| Dec. 2, 1972 | Japan | 47-120936 |
| Jan. 19, 1973 | Japan | 48-8801 |
| Feb. 9, 1973 | Japan | 48-16856 |
| Feb. 16, 1973 | Japan | 48-19602 |
| Apr. 2, 1973 | Japan | 48-38117 |

[52] U.S. Cl. .................. 106/21; 106/27; 106/31; 428/913
[51] Int. Cl.² ................ C09D 11/06; C09D 11/12
[58] Field of Search .............. 106/21, 31, 27, 231; 428/913

[56] References Cited

UNITED STATES PATENTS

| 2,324,671 | 7/1943 | Berstein | 106/231 |
| 3,560,229 | 2/1971 | Farnham | 106/21 |

*Primary Examiner*—Theodore Morris
*Attorney, Agent, or Firm*—Sughrue, Rothwell, Mion, Zinn & Macpeak

[57] ABSTRACT

An excellent thermochromic material exhibiting a sharp and reversible metachromatism at temperatures within a range of from −40° to 80° C can be formed from (A) an electron-donating, chromatic organic compound; (B) a compound containing a phenolic hydroxyl group; (C) a compound selected from the group consisting of higher aliphatic monovalent alcohols; and (D) a compound selected from the group consisting of higher aliphatic monovalent acid alcohol esters. The excellent thermochromic characteristics of such a thermochromic material can be further improved when it is occluded in fine microcapsules having a size not exceeding 50 μ. Thermochromic polymers, thermochromic printing inks, thermochromic writing instruments, thermochromic paints and thermochromic sheets having excellent thermochromatic characteristics and wide utility can be prepared from such a thermochromic material or microencapsulated thermochromic material.

9 Claims, 7 Drawing Figures

THERMOCHROMIC MATERIALS

CROSS REFERENCE TO THE RELATED APPLICATION

This application is a continuation-in-part application of application Ser. No. 365,330, filed May 30, 1973, now abandoned.

BACKGROUND OF THE INVENTION

1. Field of the Invention

This invention relates to a thermochromic material comprising, as indispensable components, an electron-donating, chromatic organic compound, a compound having a phenolic hydroxyl group and a compound selected from the group consisting of higher aliphatic monatomic alcohols and higher aliphatic monatomic acid alcohol esters.

2. Description of the Prior Art

Metal complex crystals having specific thermochromic properties have heretofore been used as thermochromic materials. However, in these metal complex crystals the metachromatic temperature range is substantially from 50° C to about 300° C or higher, and in most of these conventional thermochromic materials the methacromatism is caused to occur at temperatures exceeding 100° C, and none of them exhibit methacromatism at ordinary ambient temperatures. Accordingly, their applications are limited. Further, in these complexes, the color or methachromatism-causing temperature cannot be freely chosen, but is inherently determined by the properties of the complexes per se.

More specifically, the number of substances undergoing metachromatism at temperatures not exceeding 100° C is limited to 2 or 3. For instance, in the case of $Ag_2HgI_4$, the metachromatism from yellow to orange occurs at 50° C, and in the case of $Cu_2HgI_4$ metachromatism from red to brown is brought about at 70° C. Of course, the kind of color cannot be optionally chosen and there is no marked difference between colors before and after metachromatism.

Moreover, since these metal complex crystals are not light-transmitting, it is impossible to optionally hide or reveal the background using these metal complex crystals.

Still further, since most of these complex salts exhibiting metachromatic characteristics contain heavy metals (especially those complex salts exhibiting metachromatism at a temperature of less than 100° C) such as mercury as mentioned above, care must be taken so as to prevent accidents, especially environmental pollution, when such complex salts are employed. From this viewpoint, it is impossible to employ a large quantity of such complex salts without difficulty.

As another example of a conventional thermochromic material, there can be mentioned liquid crystals in which metachromatism occurs at temperatures ranging from −10° C to +200° C. However, the number of liquid crystals undergoing metachromatism at a temperature not exceeding 0° C is very limited, namely 1 or 2. As in the case of the foregoing metal complex crystals, the color or metachromatism-causing temperature cannot freely be chosen but is determined by the properties of the liquid crystals per se. In other words, a substance having a desired color and a desired metachromic temperature must be chosen from substances heretofore synthesized or it must be newly synthesized.

Since these metachromatic compounds are chemically very sensitive, their properties are readily degraded upon contact with other substances. Further, a black underground is required in the case of cholesteric liquid crystals and therefore, only materials of a dark hue are obtained. Moreover, these compounds are very expensive. In view of the foregoing defects, use of these compounds as thermochromic materials includes various commercial and industrial limitations and difficulties, and their fields of application are very limited.

Many uses in which the phenomenon of a color change caused by a change in temperature is utilized have been considered, but materials suitable for such a purpose have not been found and development of thermochromic materials excellent in thermochromic characteristics have been greatly demanded in the art.

SUMMARY OF THE INVENTION

It is, therefore, a primary object of this invention to provide thermochromic materials of a new type which overcome the above-mentioned defects and shortcomings involved with known thermochromic substances.

Other objects and advantages of this invention will be apparent from the description given hereinafter.

In accordance with a fundamental aspect of this invention, there is provided a thermochromic material which comprises (A) one or more electron-donating chromatic organic compounds; (B) one or more compounds having a phenolic hydroxyl group; (C) one or more compounds selected from the group consisting of higher aliphatic monovalent alcohols; and (D) a compound selected from the group consisting of higher aliphatic monovalent acid alcohol esters.

Component (C) affects the temperature of coloration/decoloration and component (D) affects the sharpness and the temperature of coloration/decoloration.

In such thermochromic material of this invention, metachromatism occurs at temperatures ranging from about −40° C to about +80° C, which covers ordinary ambient temperatures. Further, it is a characteristic feature of the thermochromic material of this invention that metachromatism is possible at temperatures lower than 0° C, especially −30° C or lower, which is not encountered with in conventional thermochromic materials. It is a great industrial advantage and a significant contribution to the art that this invention makes it possible to use thermochromic materials at low temperatures.

It is the most characteristic feature of this invention that the combination of the metachromatism-causing temperature and colors can be freely and optionally chosen in the thermochromatic material of this invention. More specifically, the color is chosen depending on the kind of electron-donating, chromatic organic compound, the metachromatism is caused by the compound having a phenolic hydroxyl group, and the metachromatism-causing temperature is determined by the kind or amount incorporated of the compound selected from the group consisting of alcohols, esters, ketones and ethers. In other words, by combining these compounds appropriately, it is possible to select an optional color among red, blue, yellow, green, orange, violet, black and other delicate mixed colors and to change such color to colorless or colorless transparency to such a color, at temperatures ranging from about −40° C to about +80° C.

As a result of our research on metachromatism caused by the reaction between an electron-donating, chromatic organic compound and a compound having a phenolic hydroxyl group, we arrived at the novel finding that when a compound selected from the group consisting of higher aliphatic monatomic alcohols and higher aliphatic monatomic acid alcohol esters is reacted with both of these components, the metachromatism takes a different form, depending on the temperature.

We further found that since this metachromatism is a conspicuous, reversible change from a color to a colorless transparency or from a color (I) to a color (II), and the background can be optionally hidden or revealed in a reversible manner, if the foregoing metachromatic system is combined with another material, there can be obtained an excellent thermochromic material.

Based on these findings, we have now completed this invention.

DETAILED DESCRIPTION OF THE INVENTION

The metachromatism in the thermochromic material of this invention will now be illustrated more specifically by reference to several illustrative compositions. For instance, in the following composition,

| (I) | (A) Electron-donating, chromatic organic substance 5% by weight | |
|---|---|---|
| | (B) 2,2-bis(4'-hydroxy phenyl)propane | 15% by weight |
| | (C) Higher aliphatic monatomic alcohol | 80% by weight |
| | Kind of Alcohol Used | Metachromatism-Causing Temperature |
| | oleyl alcohol | −22 ~ −−° C |
| | lauryl alcohol | 5 ~ 16° C |
| | myristyl alcohol | 24 ~ 35° C |
| | cetyl alcohol | 32 ~ 45° C |
| | stearyl alcohol | 41 ~ 53° C |
| | docosyl alcohol | 52 ~ 63° C | wherein the temperature range shows the color change-initiating temperature to the color change-completion temperature, if Crystal Violet lactone (blue) Rhodamine B lactam (red), 3-diethylamino-6-methyl-7-chlorofluoran (vermilion), 3-diethylamino-5-methyl-7-dibenzylamino fluoran (green), 3,6-bis-methoxy fluoran (yellow) or the like is chosen as the electron donating, chromatic organic compound, a desired color can be optionally obtained.

Similarly, with the following compositions (II) and (III) the color can be freely varied by the choice of the electron-donating, chromatic organic substance.

| (II) | (A) Electron-donating, chromatic organic substnace | | 5% by weight |
|---|---|---|---|
| | (B) 2,2-bis(4'-hydroxy phenyl)propane | | 15% by weight |
| | (D) Higher aliphatic monatomic acid alcohol ester | | 80% by weight |
| | Kind of Ester Used | | Metachromatism-Causing Temperature |
| | octyl caprylate | | −45 ~ −30° C |
| | decyl caprylate | | −28 ~ −12 |
| | octyl caprate | | −28 ~ −13 |
| | decyl caprate | | −18 ~ −2 |
| | cetyl caprate | | 4 ~ 19 |
| | steary caprate | | 11 ~ 27 |
| | butyl laurate | | −34 ~ −17 |
| | octyl laurate | | −17 ~ −1 |
| | lauryl laurate | | 0 ~ 17 |
| | stearyl laurate | | 22 ~ 37 |
| | butyl myristate | | −25 ~ −10 |
| | decyl myristate | | −3 ~ 13 |
| | myristyl myristate | | 24 ~ 39 |
| | cetyl myristate | | 33 ~ 40 |
| | octyl palmitate | | −4 ~ 12 |
| | butyl stearate | | 0 ~ 16 |
| | decyl stearate | | 10 ~ 25 |
| | lauryl stearate | | 22 ~ 38 |
| | stearyl stearate | | 37 ~ 52 |
| | 12-hydroxy stearic acid triglyceride | | 40 ~ 55 |
| (III) | (A) Electron-donating chromatic organic substance | | 5% by weight |
| | (B) 2,2-bis(4'-hydroxy phenyl)propane | | 15% by weight |
| | (C) Higher aliphatic monatomic alcohol (D) Higher aliphatic monatomic acid alcohol ester | | 80% by weight |
| Component (C) or (D) | | Weight ratio | Metachromatism-Causing Temperature |
| docosyl alcohol | stearyl stearate | (8:2) | 51 ~ 56° C |
| stearyl alcohol | stearyl stearate | (8:2) | 49 ~ 53 |
| stearyl alcohol | stearyl laurate | (8:2) | 43 ~ 48 |
| stearyl alcohol | cetyl myristate | (5:5) | 39 ~ 45 |
| stearyl alcohol | lauryl stearate | (8:2) | 43 ~ 49 |
| stearyl alcohol | stearyl laurate | (4:6) | 40 ~ 45 |
| cetyl alcohol | cetyl myristate | (8:2) | 33 ~ 39 |
| cetyl alcohol | stearyl laurate | (8:2) | 34 ~ 38 |
| cetyl alcohol | stearyl caprate | (7:3) | 30 ~ 34 |
| cetyl alcohol | lauryl palmitate | (7:3) | 30 ~ 35 |
| cetyl alcohol | lauryl laurate | (7:3) | 26 ~ 32 |
| cetyl alcohol | lauryl stearate | (8:2) | 34 ~ 39 |

-continued

| | | | |
|---|---|---|---|
| myristyl alcohol | cetyl myristate | (5:5) | 25~ 31 |
| myristyl alcohol | cetyl caprate | (7:3) | 21~ 26 |
| myristyl alcohol | decyl myristate | (6:4) | 13~ 17 |
| myristyl alcohol | lauryl laurate | (7:3) | 13~ 19 |
| myristyl alcohol | decyl myristate | (8:2) | 15~ 19 |
| lauryl alcohol | decyl myristate | (6:4) | 7~ 12 |
| lauryl alcohol | butyl myristate | (7:3) | 0~ 5 |
| lauryl alcohol | butyl laurate | (6:4) | −9~ −5 |
| lauryl alcohol | octyl laurate | (7:3) | −7~ −1 |
| lauryl alcohol | octyl caprate | (7:3) | −8~ −4 |
| oleyl alcohol | decyl caprate | (6:4) | −10~ −6 |
| oleyl alcohol | decyl caprylate | (6:4) | −25~−21 |
| oleyl alcohol | octyl caprate | (5:5) | −28~−23 |
| oleyl alcohol | octyl caprylate | (5:5) | −43~−37 |
| oleyl alcohol | butyl laurate | (5:5) | −22~−18 |

As will be apparent from the above, the metachromatism-causing temperature can be freely controlled by the selection of components (C) and (D), and great differences are observed in the color concentration and the sensitivity of the color change of the composition obtained. For example, assuming that the color concentration of components (A) + (B) + (C) is 100, that of components (A) + (B) + (D) is 50 – 60 and that of components (A) + (B) + (C) + (D) is 100 – 120. Thus, the use of components (C) + (D) is excellent as compared with component (C) or (D) alone.

In more detail, in the case of using only component (C) (only the alcohol), the color concentration of the composition is sufficiently high, but there are disadvantages in that the sensitivity of the color change is poor (i.e., the temperature range from the color change-initiating temperature to the color change-completion temperature is as high as 10° to 15° C), and due to a somewhat limited selection of compounds used as component (C) it is difficult to freely obtain any desired metachromatic temperature. Further, in the case of only using the alcohol ester (component alone (D)) the color concentration of the compound is low and the sensitivity of color change is very poor since the temperature range for the color change is 15° – 20° C; however due to a large selection of compounds useful as component (D) it is very useful to optionally control the color change temperature.

On the contrary, though the reason is not entirely clear at the present, it is apparent that by mixing component (C) and component (D) one obtain the extremely useful characteristics shown below as compared with the use of component (C) or component (D) alone.

1. By mixing component (C) and component (D) in various combinations, various kinds of thermochromic compositions can be obtained.

2. By varying the ratio of component (C) and component (D) to the extent of about 10%, for example, to vary the ratio of "(C):(D) = 8:2" to "C:D = 9:1" or "C:D = 7:3", the color change temperature can transfer to 2° to 3° C, for example, 10°–20° C to 8°–18° C or 12°–22° C, therefore it is quite easy to slightly alter the color change temperature.

3. The color concentration of the composition is sufficiently high.

4. The sensitivity of color change is as sharp as about 5° C, which is an improvement of about 2–3 times as compared with a composition comprising only component (C) or component (D) alone.

As pointed out above, according to conventional techniques a thermochromic substance having a desired color and a desired metachromatism-causing temperature must be chosen from compounds heretofore synthesized, or it must be newly synthesized. In contrast, according to this invention, a thermochromic material having the desired metachromatic characteristics can be chosen very freely.

Further, the thermochromic material of this invention can be clearly distinguished from conventional materials at the point that the metachromatism is conspicuous and is reversible from a color to colorless or from colorless to a color. When an ordinary dyestuff or pigment is incorporated in the thermochromic material of this invention, it is possible to change color (I) to color (II) reversibly. Further, it is another characteristic feature of the thermochromic material of this invention that light can be transmitted or absorbed. This characteristic feature is apparent from Table 1 given hereinafter.

The mixing ratio of components (A), (B), (C) and (D) in the composition of this invention can vary within a wide range, depending upon the components and the uses of the composition, but a composition having a weight ratio of:

component (A): 1–20% by weight
component (B): 2–30% by weight
component (C): 10–90% by weight
component (D): balance to make 100% by weight The preferred ratio of component (C) to component (D) to obtain the most excellent characteristics of the present invention as mentioned above is achieved by using component (C) and (D) in about a 9:1 to about a 4:6 ratio by weight is generally sufficient to obtain the above-mentioned thermochromic characteristics. However, such a composition has a poor in color concentration as compared with a conventional dye or pigment. Therefore, for the use in photogravure printing or the like in which the amount coated is very small, it is necessary to increase the color concentration of the composition of this invention to a higher degree, for example:

component (A): 8–20% by weight or
component (B): 20–30% by weight, and if further high concentration is required:
component (A): 8–20% by weight and
component (B): 20–30% by weight.

Each of components (A), (B) and (C) may comprise two or more compounds in combination. In order to improve the properties of the thermochromic material of this invention, it is possible to incorporate an additive in the above three components. As such an additive, there can be mentioned, for instance, an antioxidant, an aging-preventive agent, an ultraviolet absorber, a dissolving assistant, a diluent, a sensitizer and the like. These materials may be used in an amount of from about 0.1 to about 10 parts by weight based on the thermochromatic material of this invention, and can be used in the various embodiments as described. Preferred of such additives used in various embodiments of this invention are benzotriazoles, benzophenones and phenyl salicylates in an amount effective as an ultraviolet absorbent and dilauryl thiodipropionate and distearyl thiodipropionate in an amount effective as an anti-oxidant.

The electron-donating chromatic organic compounds used in the present invention are generally colorless. They are known in the art to produce colors upon reaction with acidic materials, for example, solid acids such as bentonite, kaolin and attapulgite, carboxylic acid, sulfuric acid, zinc chloride and the like.

However, the color-forming compounds obtained by reaction between the electron-donating chromatic organic compounds and the strong acidic materials as described above do not decolor according to temperature changes after they are further combined with compounds selected from higher aliphatic monatomic alcohols and higher aliphatic monatomic acid alcohol esters.

On the other hand, the combination of the colorless, electron-donating chromatic organic compounds with weakly acidic materials having a phenolic hydroxyl group, for example, alkylphenols, alkylphenylphenols, gallic acid alcohols esters, p-oxybenzoic acid alcohols esters and the like, upon combination with a compound selected from higher aliphatic monatomic alcohols and higher aliphatic monatomic acid alcohol esters yield a material which can vary in color with temperature changes.

As the electron-donating chromatic organic compound used in this invention, there can be mentioned, for example, diaryl phthalides, polyarylcarbinols, leuco-auramines, acylauramines, arylauramines, Rhodamine B lactams, indolines, spiropyranes, fluorans and the like.

Preferred on the materials illustrative of component (A) are fluoran leuco compounds, triphenylmethane phthalide leuco compounds and lactam leuco compounds.

The desired metachromatism can be achieved by employing the above recited compounds, and a more favorable thermochromatic effect can be obtained by employing those electron-donating chromatic organic compounds having a lactone ring —CO—O— or a lactan ring —CONH— in their molecule.

Specific examples of compound (A) include Crystal Violet lactone, Malachite Green lactone, Michler's hydrol, Crystal Violet carbinol, Malachite Green carbinol, N-(2,3-dichlorophenyl)-leuco auramine, N-benzoyl auramine, N-acetyl auramine, N-phenyl auramine, Rhodamine B lactam, 2-(phenyliminoethylidene)-3,3-dimethyl-indoline, N,3,3-trimethyl-indolinobenzospiropyran, 8'-methoxy-N,3,3-trimethylindolino-spiropyran, 3-diethylamino-6-methyl-7-chloro-fluoran, 3-diethylamino-7-methoxy-fluoran, 3-dimethylamino-6-benzyloxy-fluoran, 1,2-benzo-6-diethylaminofluoran, 3,6-di-p-toluidino-4,5-dimethylfluoran-phenylhydrazide-γ-lactam, 3-amino-5-phenyl-8-methyl-fluoran, 2-methyl-3-amino-6-methyl-7-methyl-fluoran, 2,3-butylene-6-di-n-butylamino-fluoran, 3-diethylamino-7-anilino-fluoran, 3-diethylamino-7-(p-toluidino)-fluoran, 7-acetamino-3-diethylamino-fluoran, 2-bromo-6-cyclohexylamino-fluoran, 2,7-dichloro-3-methyl-6-n-butylamino-fluoran and the like.

As the compound having a phenolic hydroxyl compound, there can be employed monophenols and polyphenols. These phenol compounds may be substituted with alkyl groups, aryl groups, acyl groups, alkoxycarbonyl groups, halogen atoms and the like.

Specific examples of compound (B) used in this invention include tert-butyl phenol, nonyl phenol, dodecyl phenol, styrenated phenol, 2,2'-methylene-bis(4-methyl-6-tert-butyl-phenol), α-naphthol, β-naphthol, hydroquinone monomethyl ether, guaiacol, eugenol, p-chlorophenol, p-bromophenol, o-chlorophenol, o-bromophenol, o-phenylphenol, p-phenylphenol, p-(p-chlorophenyl)-phenol, o-(o-chlorophenyl)-phenol, methyl p-hydroxybenzoate, ethyl p-hydroxybenzoate, propyl p-hydroxybenzoate, octyl p-hydroxybenzoate, dodecyl phenol 3-isopropyl-catechol, p-tert-butyl-catechol, 4,4'-methylene-diphenol 4,4'-thio-bis(6-tert-butyl-3-methyl-phenol), bisphenol A, 1,2-dihydroxynaphthalene, 2,3-dihydroxynaphthalene, chlorocatechol, bromocatechol, 2,4-dihydroxybenzophenone, phenol, phthalein, o-cresol phthalein, methyl protocatechuate, ethyl protocatechuate, propyl protocatechuate, octyl protocatechuate, dodecyl protocatechuate, 2,4,6-trihydroxymethyl-benzene, methyl gallate, ethyl gallate, propyl gallate, butyl gallate, hexyl gallate, octyl gallate, dodecyl gallate, cetyl gallate, 2,3,5-trihydroxynaphthalene, tannic acid, phenol-formaldehyde prepolymers and the like.

A preferred class of the component (B) materials includes the alkyl-monophenols, alkyl-diphenols, thio-bis-alkyl-phenols, alkylphenylphenols, alkyl-catechols, hydroxy-alkylnaphthalenes, dihydroxy-alkylnaphthalenes (any alkyl moiety having 1 to 12 carbon atoms,) gallic acid alcohol esters, p-oxybenzoic acid alcohol esters, protocatechuic acid alcohol esters and phenol-formaldehyde prepolymers.

The desired metachromatism can be obtained using the above recited compounds. In practice, preferred compounds having a phenolic hydroxyl group are those having a molecular weight of from about 200 to about 800.

As the alcohol used as component (C) in this invention, there can be mentioned higher aliphatic monovalent alcohols. Specific examples of such alcohol compounds include lauryl alcohol, myristyl alcohol, cetyl alcohol, stearyl alcohol, docosyl alcohol, oleyl alcohol, and the like.

The desired metachromatism can be obtained using the above recited compounds. In practice, preferred alcohols are those having a molecular weight from about 150 to about 500.

As the alcohol ester used as component (D) in this invention, there can be exemplified octyl caprylate, decyl caprylate, octyl caprate, decyl caprate, cetyl caprate, stearyl caprate, butyl laurate, octyl laurate, lauryl laurate, stearyl laurate, butyl myristate, decyl myristate, myristyl myristate, cetyl myristate, octyl palmitate, butyl stearate, decyl stearate, lauryl stearate, stearyl stearate, 12-hydroxy stearic acid triglyceride and the like.

The desired metachromatism can be obtained using the above recited compounds. In practice, the preferred esters are those having a molecular weight of from about 150 to about 1,000.

It is preferred that the compounds used as components (C) and (D) be stable, non-volatile, odorless and relatively non-toxic, and it is preferred that component (C) be selected from lauryl alcohol, myristryl alcohol, cetyl alcohol, stearyl alcohol, docosyl alcohol, oleyl alcohol or mixtures thereof, and component (D) be selected from octyl caprylate, decyl caprylate, octyl caprate, decyl caprate, cetyl caprate, stearyl caprate, butyl laurate, octyl laurate, lauryl laurate, stearyl laurate, butyl myristate, decyl myristate, myristyl myristate, cetyl myristate, octyl palmitate, butyl stearate, 1,2-hydroxy stearic acid triglyceride or mixtures thereof.

With respect to the compound having a phenolic hydroxyl group, it is most preferred to use those with smaller substituents. The reason for this is that as a compound having a phenolic hydroxyl group contains larger and larger substituents, the thermochromatic activity gradually lowers. Accordingly, a slight fall off the thermochromic affect will gradually be noted. A similar fall off in the thermochromic affect is noted with nitrogen containing phenolic compounds.

Obviously, the above limitations are not exclusive limitations in the sense of eliminating classes of materials from the present invention since the effect is one of degree, but they do serve to provide one skilled in the art with guidelines which will enable a maximum thermochromatic effect to be obtained.

In accordance with another aspect of this invention, the foregoing three components (A), (B) and (C) are occluded in microcapsules according to a known microencapsulation technique, whereby the utility of the thermochromic material of this invention is further elevated.

More specifically, when two or more microencapsulated thermochromic materials of this invention, indicating a certain metachromatism-causing temperature and color, respectively, are combined, the metachromatic effects of each thermochromic material can be attained independently, even when the metachromatism-causing temperatures approximate each other very closely.

For instance, when (1) a thermochromic material changing from yellow to achromatic color at 10° C; (2) a thermochromic material changing from blue to colorless at 20° C; and (3) a thermochromic material changing from red to colorless at 30° C are simply blended, there is obtained a thermochromic material exhibiting a dim metachromatism of from black to achromatic color at a temperature approximating 10° to 20° C. That is, since there are no partition layers separating thermochromic materials (1), (2) and (3) from one another, they are influenced by one another and only a mixed color is manifested with an absence of sharpness in the metachromatism.

In contrast, when thermochromatic materials (1), (2) and (3) are independently occluded in microcapsules having a size less than about 50 $\mu$, preferably less than 30 $\mu$ and they are mixed in the microencapsulated state, there is obtained a thermochromic material which exhibits a black color at a temperature below 10° C, a violet color at 10° to 20° C, a red color at 20° to 30° C, and colorless at a temperature exceeding 30° C. When such thermochromic material is gradually cooled from a temperature exceeding 30° C, there is observed a multiple metachromatism of colorless → red → violet → black. According to this principle, it is possible to obtain a thermochromic material exhibiting metachromatism of a greater number of colors. Further, in such a microencapsulated thermochromic material, the metachromatism is characterized by high sharpness. This is due to the fact that each thermochromic material protected by microcapsule walls exhibits independent thermochromic activity without being influenced by the other thermochromic materials. This is one valuable feature attained by this invention.

Further, since the thermochromic materials are protected by capsule walls, even when they have contact with one another or with a reactive substance, their thermochromic properties are not degraded, and, therefore, their application fields can be greatly broadened. For instance, even when such microencapsulated thermochromic materials are contacted with an acidic substance, an alkaline substance, a peroxide or other chemically active substance, their thermochromic properties are not degraded.

In this invention, the microencapsulation can be performed by any conventional microencapsulation technique, for instance, interfacial polymerization, in situ polymerization, in-liquid curing coating, coacervation from an aqueous solution system, coacervation from an organic solvent solution system, melt-dispersing and cooling, in-gas suspending coating, spray drying and the like. These conventional techniques can be chosen and employed depending on the intended use of the resulting thermochromic material.

The foregoing basic thermochromic material and microencapsulated thermochromic material of this invention can be converted into more useful and excellent materials, without degradation of their inherent excellent properties, when they are combined with other materials.

For instance, the basic thermochromic material and microencapsulated thermochromic material of this invention can be formed into (a) thermochromic polymers, (b) thermochromic printing inks, (c) thermochromic writing instruments, (d) thermochromic paints (e) thermochromic sheets and the like according to conventional techniques. These applications of the basic thermochromic material and microencapsulated thermochromic material of this invention will now be illustrated in more detail.

(a) Thermochromic Polymers:

The basic thermochromic material or microencapsulated thermochromic material can be incorporated homogeneously into a polymer without degradation of their inherent excellent properties, whereby there is obtained a thermochromic polymer composition.

The polymers used in the present invention to "hold" the thermochromic material for various purposes are in no manner limited with respect to molecular weight, degree of polymerization, melt index or the like. The only requirement that such polymers need exhibit is that they contain the thermochromic material without degrading it. In this regard, most preferred for this purposes are the polyolefins, which are substantially completely inert with respect to the thermochromic materials of the present invention. Of the polyolefins, polyethylene, polypropylene and polyethylene-polypropylene copolymers are most preferred.

Most specifically, when a thermoplastic polymer is rendered molten by heating and a thermochromic material of this invention is kneaded homogeneously with the polymer melt, there is obtained a thermochromic thermoplastic polymer.

In the case of a thermosetting polymer, when a thermochromic material of this invention is homogeneously blended with polymer-forming constituents and the polymerization is allowed to proceed by an action of a curing agent or catalyst or under heat, a thermochromic thermosetting polymer is obtained.

Further, these thermochromic polymers can be shaped or formed into various thermochromic articles or materials such as blocks, films, filaments, fine particles, rubbery elastomers, liquids and the like. This aspect will be detailed hereinbelow.

1. When a basic thermochromic material or microencapsulated thermochromic material of this invention is uniformly incorporated into resinous substances such as polyethylene, polypropylene, polystyrene, polymethyl methacrylate, unsaturated polyesters, epoxy resin, allyl resins and polyurethanes, there can be obtained semi-transparent or transparent blocks having a thermochromic property.

2. When a basic thermochromic material or microencapsulated thermochromic material of this invention is uniformly blended with polyethylene, polyvinylidene, chloride, ionomers and the like, films having a thermochromic property can be obtained from such blends.

3. When a basic thermochromic material or microencapsulated thermochromic material of this invention is uniformly blended with polypropylene, polyamides and the like, filaments having a thermochromic property can be obtained from such blends.

4. When a basic thermochromic material or microencapsulated thermochromic material of this invention is uniformly blended with polyethylene, polyvinyl acetal and the like, fine particles having a thermochromic property can be obtained from such blends.

5. When a basic thermochromic material or microencapsulated thermochromic material of this invention is uniformly blended with butyl rubber, polyisoprene, ethylene-propylene copolymers and the like, rubbery elastomers having a thermochromic property can be obtained from such blends.

6. When a basic thermochromic material or microencapsulated thermochromic material of this invention is uniformly blended with polybutene, polyisobutylene and the like, there can be obtained liquids having a thermochromic property.

The thus formed various materials differing in form or state can be used for molding, film-formation, spinning, coating, bonding, e.g., as adhesives and the like.

When the thermochromic material of this invention is incorporated into a polymer such as is mentioned above, the amount of the thermochromic material necessary for obtaining a desired thermochromic property can be changed within a broad range and is essentially decided based on factors such as the kind of polymer and the use of the resulting polymer composition. In general a desired thermochromic property can be obtained by employing the thermochromic material in an amount of about 0.1 to about 40% by weight, preferably about 0.5 to about 20% by weight, based on the resulting polymer composition.

In this case, since the amount of wall material in a microencapsulated material is so negligible, this percentage can be considered as applying to the thermochromic material per se or the microencapsulated system. Accordingly, where percentages are given in this specification relating to the thermochromic material per se or the microencapsulated material, such percentage applies whether or not the material is microencapsulated since the amount of microencapsulating material is negligible.

In order to improve various properties of the resulting polymer composition, it is possible to add thereto additives as are usually employed in the art. Typical instances of such additives are antioxidants, ultraviolet absorbers, inorganic fillers, pigments, plasticizers, lubricants, antistatic agents, anti-blocking agents and the like.

As the polymers used for the formation of the thermochromic polymer compositions of this invention, there can be mentioned, for example, pokyethylene, polypropylene, polybutene, polyisobutylene, coumarone-indene resins, terpene resins, ethylenepropylene copolymer resins, acrylic resins such as polymethyl acrylate, polyethyl acrylate, polybutyl acrylate, polymethyl methacrylate, polyethyl methacrylate and polyacrylonitrile, vinyl acetate resins and derivatives thereof such as polyvinyl acetal, polyvinyl butyral, vinyl acetate-vinyl chloride copolymer resins and vinyl acetate-ethylene copolymer resins, halogen-containing resins such as polyvinyl chloride, polyvinylidene chloride, chlorinated polyethylene and chlorinated polypropylene, diene type polymers such as butadiene type synthetic rubber, chloroprene type synthetic rubber and isoprene type synthetic rubber, polyester resins such as saturated alkyd resins, Glyptal resins, terephthalate resins, unsaturated polyester resins, allyl resins and polycarbonate resins, and other resinous substances such as polyamide resins, silicon resins, polyvinyl ether resins, furan resins, polysulfide resins, epoxy resins, polyurethane resins, melamine resins, polyurea resins and metaxylene resins.

b. Thermochromic Printing Inks:

When the above-mentioned basic thermochromic material or microencapsulated thermochromic material of this invention is dissolved or dispersed in a printing ink vehicle, there can be obtained a thermochromic printing ink.

When such printing ink is applied on a part or all of the surface of a support such as paper, synthetic paper, plastic film, cloth, metal plate or the like according to a known printing technique, a thermochromic printed material of excellent properties and great utility can be obtained without degradation of the inherent thermochromic characteristics of the starting thermochromic material. Such materials are not attainable according to conventional techniques.

The resulting printed material, changing its color depending on the change in the temperature, can be used as an ordinary household material or an industrial material, either as it is or after it has been further processed.

Using the basic thermochromic material or microencapsulated thermochromic material of this invention, a variety of printing inks can be prepared. For instance, printing inks of the cooling-solidifying type, evaporation-drying type, permeation-drying type, precipitation-drying type, gelation-drying type, oxidative polymerization type or thermosetting type can be prepared according to this invention. Each of these printing inks includes a vehicle selected from natural resins, modified natural resins, synthetic resins, waxes, solvents and the like.

When such a printing ink is prepared using the abovementioned basic thermochromic material or microencapsulated thermochromic material, the amount of such thermochromic material necessary for obtaining a desired thermochromic property can be varied within a broad range, and this amount is essentially determined by factors such as the kind of printing ink vehicle and the use of the resulting printing ink. In general, sufficient results can be obtained by employing the thermochromic material in an amount of about 1 to about 50% by weight, preferably about 5 to about 40% by weight, based on the resulting printing ink.

Additives as are usually employed for various improving properties of printing inks can be incorporated into the printing ink composition of this invention. Typical examples of such additives are antioxidants, ultraviolet absorbers, pigments, plasticizers, anti-blocking agents and the like.

Examples of printing ink vehicles to be used in this invention are as follows:

1. Printing Ink Vehicles of the Cooling-Solidifying Type (wax type):
   carnauba wax, paraffin wax, microcrystalline wax, etc.
2. Printing Ink Vehicles of the Evaporation-Drying Type (resin/solvent type):
   rosin, rosin maleate, shellac, casein, alkyd resins, cellulose derivatives, petroleum resins, low-molecular-weight polyethylene, polystyrene, polyvinyl chloride, polyvinyl acetate, polyvinyl alcohol, petroleum solvents, aromatic solvents, alcohols, ketones, esters, water, etc.
3. Printing Ink Vehicles of the Bermeation-Drying Type (resin/petroleum solvent type):
   rosin, rosin derivatives, machine oil, spindle oil, kerosene, etc.
4. Printing Ink Vehicles of the Gelation-Drying Type (emulsion type):
   vinyl copolymer latexes, synthetic rubber latexes, etc.
5. Printing Ink Vehicles of the Gelation-Drying Type (resin/solvent type):
   alkyd resins, modified rubbers, petroleum solvents, etc.
6. Printing Ink Vehicles of the Oxidative Polymerization Type (drying oil type):
   polymerized linseed oil, tung oil, dehydrated castor oil, oiticica oil, etc.
7. Printing Ink Vehicles of the Oxidative Polymerization Type (oil-modified alkyd type):
   soybean oil-modified alkyd resins, coconut oil-modified alkyd resins, linseed oil-modified alkyd resins, etc.
8. Printing Ink Vehicles of the Thermosetting Type (thermosetting resin type):
   epoxy resins, amino resins, thermoreactive unsaturated hydrocarbon resins, etc.

A suitable vehicle can be chosen from among the foregoing examples depending on the kind of thermochromic material and the intended use of the resulting printing ink composition. Using the thus prepared printing ink composition, a desired printed material can be obtained by intaglio, relief, lithographic or other printing method.

c. Thermochromic Writing Instruments:

When the above-mentioned basic thermochromic material or microencapsulated thermochromic material of this invention is dissolved or dispersed in a solvent, with use of the resulting liquid it is possible to obtain writing instruments such as a marker, a ball pen, a tube color and the like. Alternately, when the basic thermochromic material or microencapsulated thermochromic material of this invention is solidified using of a suitable vehicle, it is possible to obtain a writing instrument such as crayon, pencil and the like. In preparing such writing instruments, the inherent thermochromic characteristics of the thermochromic material of this invention are not degraded at all.

Using the thus obtained writing instrument, it is possible to conveniently write on paper, synthetic paper, plastic film, metal plates, wood and the like. Since the resulting written figure, letter or pattern changes its color depending on the change in the temperature, these writing instruments are conveniently used in fields in which pleasure, interest or the magical effect caused by such a color change is highly valued. Of course, these writing instruments can be used as temperature-indicating writing instruments.

In the case where the basic thermochromic material or microencapsulated thermochromic material is used for the formation of an ink for a writing instrument, the amount of the thermochromic material used can be varied within a broad range and the amount is essentially determined by the kind of ink vehicle and the intended use of the resulting writing instrument. In general, a desired thermochromic property is sufficiently obtained by employing the thermochromic material in an amount of about 1 to about 50% by weight based on the resulting ink for a writing instrument.

As the vehicle used for formation of a solid type writing instrument, there can be employed, for example, n-paraffin, isoparaffin, dibenzylbenzene, triphenyl, stearyl amide, metal soaps, carnauba was, bees wax, haze wax, insect wax, montan wax, polyethylene having a molecular weight less than 5000, polypropylene having a molecular weight of less than 5000 and polystyrene having a molecular weight less than 5000.

In the case that compounds such as docosyl alcohol, eicosyl alcohol, stearyl alcohol, cetyl alcohol, polyethylene glycol (having a molecular weight of 6,000 to 20,000) and the like are used as component (C) of the thermochromic material of this invention, it is unnecessary to employ the vehicle described above.

As organic solvents used for dissolving or dispersing the thermochromic material of this invention for forming an ink for a writing instrument, there can be mentioned, for example, methyl alcohol, ethyl alcohol, propyl alcohol, butyl alcohol, hexyl alcohol, octyl alcohol, methyl acetate, ethyl acetate, propyl acetate, butyl acetate, dibutyl phthalate, dioctyl phthalate, acetone, methylethylketone, methyl-iso-butylketone, toluene, xylene, dibenzylbenzene, benzyl alcohol, triethylene glycol, hexylene glycol, ethylene glycol monoethyl ether, ethylene glycol monophenyl ether and the like.

When compounds such as octyl alcohol, iso-cetyl alcohol, iso-stearyl alcohol, benzyl alcohol, hexylene glycol, dibutyl phthalate, iso-amyl butyrate, cyclohexanone, di-iso-butylketone, ethyl phenyl ether, di-iso-amyl ether and the like are employed as component (C) of the thermochromic material of this invention, it is unnecessary to employ any solvent.

In the case of a solid type writing instrument or a marker type writing instrument, a binder can be used in order to improve the graphic properties thereof. As such binder, there can be exemplified ethyl cellulose, nitrocellulose, polyvinyl acetate, polyvinyl butyral, vinyl chloride-vinyl acetate copolymers, polyacrylates, ketone resins, styrene-allyl alcohol copolymers, modified maleic resins, petroleum resins, coumarone resins, indene resins, terpene resins, rosin ester resins, shellac and the like.

Additives as are ordinarily used to improve the properties of writing instruments can be added in preparing a thermochromic writing instrument according to this invention. For example, antioxidants, ultraviolet absorbers, thermostabilizers, lubricants, reinforcers and the like can be employed.

d. Thermochromic Paints:

When the above-described basic thermochromic material or microencapsulated thermochromic material of this invention is dissolved or dispersed in a paint vehicle, there can be obtained a thermochromic paint. Such a paint can be applied as desired any of paper, synthetic paper, plastics, cloth, metal, porcelain, glas, wood and the like.

In the resulting coating the inherent thermochromic characteristics of the thermochromic material are not degraded, and the coating changes its color depending on a change in the temperature. Therefore, thermochromic paint according to this invention can be conveniently used in the fields where pleasure, interest or a magical effect caused by such a color change is highly valued, and it can also be used as a temperature-indicating paint.

Usually, such a thermochromic paint is prepared by dissolving or dispersing a basic thermochromic material or microencapsulated thermochromic material of this invention into a vehicle such as a natural resin, a modified natural resin, a synthetic resin, a solvent or the like. The amount of the thermochromic material of this invention necessary for imparting a desired thermochromic property to the resulting paint can be changed within a broad range, and this amount is essentially determined by the kind of the paint vehicle used and the intended use of the resulting paint. In general, sufficient results can be obtained by incorporating the thermochromic material of this invention in an amount of about 1 to about 50% by weight, preferably about 5 to about 40% by weight, based on the resulting paint. Additives as are customarily used for improving the properties of paints can be incorporated into the thermochromic paint according to this invention. Typical examples of such additives are plasticizers, drying-promotors, thickners, ultraviolet absorbers, flattening agents, etc.

As the resin used as a paint vehicle, there can be exemplified modified alkyd resins, unsaturated polyester resins, phenol resins, epoxy resins, amino resins, polyurethane resins, silicone resins, cellulose resins, hydrocarbon resins, vinyl acetate resins, butyral resins, vinyl chloride resins, vinyl chloride-vinyl acetate copolymer resins, acrylic resins, natural and synthetic rubber, emulsions such as polyvinyl acetate emulsions, styrene-butadiene latexes, acrylic emulsions, styrene-acrylic emulsions and butadiene-nitrile emulsions, water-soluble resins such as polyvinyl alcohol, polyvinyl methyl ether, water-soluble amino resins and water-soluble acrylic resins, and resins soluble in alkali aqueous solutions, such as shellac, casein, zein, and styrene-maleic acid copolymer resins.

As the solvent used as a paint vehicle, there can be mentioned, for example, aliphatic hydrocarbons, aromatic hydrocarbons, halogenated hydrocarbons, alcohols, ketones, esters, ethers, ether alcohols, ketone alcohols, ketone ethers, ketone esters, ester ethers, water and the like.

These vehicles can be chosen appropriately depending on the kind of the thermochromic material and the intended use of the resulting paint, and they can be used singly or in the form of a mixture of two or more thereof.

As described above, a suitable vehicle selected depending on the kind of the thermochromic material of this invention, the intended use of the resulting paint and the like is used for formation of a thermochromic paint in accordance with this invention. When the thus prepared paint is applied to a material to be painted in any customary painting method, for example, brush coating, cold spray coating, hot spray coating, immersion coating, flow coating, roller coating, curtain flow coating or other methods, there is obtained a printed material having thermochromic properties.

e. Thermochromic Sheets:

When a thermochromic layer containing the above-described basic thermochromic material or microencapsulated thermochromic material of this invention is laminated on a backing liner, and, if desired, a protective layer is formed on the surface of the thermochromic layer, there can be obtained a thermochromic sheet without degradation of the inherent thermochromic characteristics of the thermochromic material of this invention. The resulting thermochromic sheet can be used as an ordinary household material or an industrial material, either as it is or after it has been further processed.

In order to form a laminate structure using the basic thermochromic material or microencapsulated thermochromic material of this invention together with a backing liner and a protective layer, it is necessary to support the thermochromic material of this invention on the backing liner by a suitable method.

For instance, a basic thermochromic material or microencapsulated thermochromic material of this invention can be so incorporated into a polymer and a film or filament formed from such polymer can be bonded under heat to the backing liner, or such a film or filament can be bonded to the backing liner using an adhesive or binder such as natural resins, synthetic resins, waxes and the like. It is also possible to form a thermochromic layer on a backing liner by coating a paint containing a basic thermochromic material or microencapsulated thermochromic material of this invention on the backing liner. In addition, coating techniques such as the fluidized immersion coating method can be employed for the formation of the thermochromic layer on a backing liner.

It is also possible to form such a thermochromic layer by dissolving or dispersing a basic thermochromic material or microencapsulated thermochromic material of this invention into a printing ink vehicle and printing or coating the resulting ink composition on a backing liner by any suitable method such as intaglio, relief, lithographic or other printing method.

The foregoing thermochromic polymers, thermochromic paints and thermochromic printing inks can be used for the formation of thermochromic laminate sheet structures.

As the backing liner used for a thermochromic laminate sheet according to this invention, there can be mentioned, for example, paper, cloth, plastics, wood, glass porcelain, metal plates and the like, and such a backing liner acts as a support for the thermochromic layer and protective layer. It is possible to form on the backing liner decorations such as patterns, pictures and photos or marks such as figures and letters. If desired, one can form an adhesive layer or a metal-plated or evaporation deposited layer on the surface of the backing liner using standard art techniques.

Films of macromolecular materials or glass plates are used as the protective layer. As the film-forming macromolecular material, there can be mentioned, for example, polyethylene, polypropylene, polystyrene, styrene-butadiene copolymers, polyesters, polyvinyl chloride, polyvinyl acetate, polyvinyl butyral, polyacrylates, polyvinyl ethers, polyvinyl alcohol, nitrocellulose, ethyl cellulose, hydroxypropyl cellulose, acetyl cellulose, starch, casein and the like. The film can be transparent, semitransparent or opaque, or it may be colored. A suitable film is chosen depending on the intended use of the resulting thermochromic sheet. Films of such macromolecular materials are directly bonded under heat, or these film-forming materials are coated or printed in the form of paints or printing inks and then they are converted to films. In order to increase the interest to viewers, it is possible to form convexities and concavities on such a protective film layer. The protective layer not only physically protects the thermochromic layer but also improves the weather resistance and other stabilities of the thermochromic material of this invention when an additive such as an ultraviolet absorber, an antioxidant or the like is incorporated into the protective layer. As in the case of the backing liner, it is possible to form decorations such as patterns, pictures and photos or marks such as figures and letters on the protective layer.

As mentioned above, a thermochromic sheet can be prepared by forming a laminate structure of a thermochromic layer and a backing liner with use of a suitable binder or adhesive and, if desired, laminating protective layer on the surface of the thermochromic layer. This aspect of this invention will now be illustrated in more detail by reference to the accompanying drawings, in which.

Figure 1:
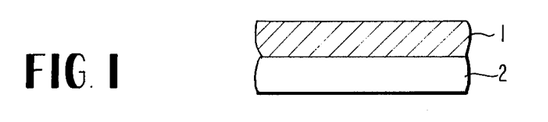
FIGS. 1 to 7 are diagrams showing sections of thermochromic sheets according to this invention.
Figure 2:
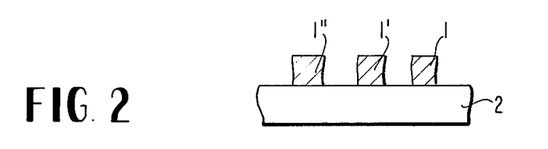

FIG. 1 illustrates a thermochromic sheet composed of a thermochromic layer 1 and a backing liner 2. The thermochromic sheet illustrated in FIG. 2 comprises a sheet partially coated with a plurality of thermochromic layers 1, 1' and 1", which may be the same or different with respect to the metachromatic color and the metachromatism-causing temperature. For example, when in the thermochromic sheet illustrated in FIG. 2 a landscape is drawn with a thermochromic layer 1 undergoing metachromatism of from green to yellow at 30° C, a thermochromic layer 1' undergoing metachromatism from red to colorless at 40° C and a thermochromic layer 1" undergoing metachromatism from blue to white at 50° C, there is obtained a picture which changes from a spring or summer landscape gradually to an autumn or winter landscape when it is heated, and the picture returns to a spring or summer landscape when it is cooled. If the thermochromic layers are so adjusted that they can be made transparent simultaneously with the metachromatism, it is possible to expose the background of the support of which such layers are coated. In this case, when a non-thermochromic color or pattern is combined therewith, a more highly aesthetic effect can be obtained.

Figure 3:
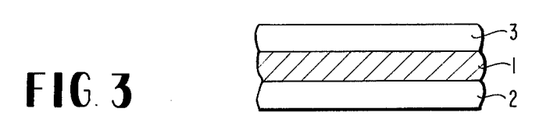
Figure 4:
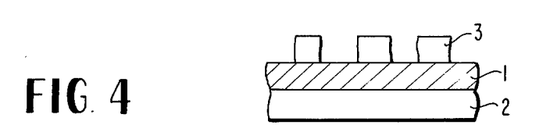
Figure 5:
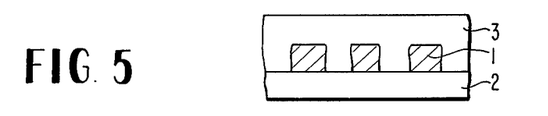
Figure 6:
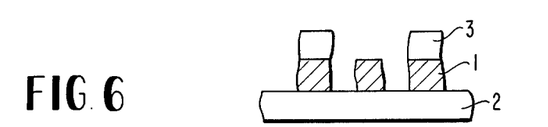

FIG. 3 illustrates a thermochromic sheet composed of a thermochromic layer, a backing liner 2 and a protective layer 3. As is illustrated in FIGS. 4, 5 and 6, the protective layer and thermochromic layer can be formed over the entire support or any over part of the support in various manners, whereby thermochromic sheets having complicated and interesting thermochromic and optical effects can be obtained.

Figure 7:
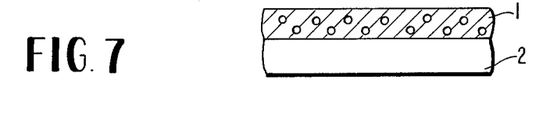

FIG. 7 illustrates a thermochromic sheet in which a thermochromic layer containing a microencapsulated thermochromic material is employed, and is seen from the foregoing explanation, many variations of this thermochromic sheet structure can be obtained.

Since the thus laminated thermochromic sheet structures contain a layer of the thermochromic material of this invention having characteristic thermochromic properties such as are detailed above, sharp and reversible multi-color metachromatism can be attained at optional temperatures within a range of from −40° C to +80° C. Accordingly, these thermochromic sheets can be used effectively and conveniently for various purpose, if desired, in combination with non-thermochromic colors, because of their excellent temperature-indicating capability, warning or cautionary capability in response to changes in temperature, the decorative effects, in addition to surprise-imparting magic effects, reversible change between light-transmitting and light-shielding properties, and the like.

This invention will now be illustrated in more detail by reference to several Examples, but the scope of this invention is not limited at all by these Examples.

Examples 1 to 29 illustrate basic thermochromic materials according to this invention.

Examples 30 to 40 illustrate microencapsulated thermochromic materials according to this invention.

Examples 41 to 49 illustrate thermochromic polymers according to this invention.

Examples 50 to 57 illustrate thermochromic printing inks according to this invention.

Examples 58 to 65 illustrate thermochromic writing inks according to this invention.

Examples 66 to 76 illustrate thermochromic paints according to this invention.

Examples 77 to 84 illustrate thermochromic sheets according to this invention.

In all of these Examples, amounts of components are expressed in terms of parts by weight, unless otherwise indicated.

The components used for formation of the thermochromic materials of Examples 1 to 29 and the reaction conditions used are shown in Table I together with data on the metachromatic colors and metachromatism-causing temperatures.

The data on the metachromatic colors and metachromatism-causing temperatures obtained with respect to thermochromic materials of Examples 30 to 84 are shown in Table II.

Comparative data on the metachromatic characteristics of thermochromic materials according to this invention and conventional thermochromic materials are shown in Table III.

EXAMPLES 1 to 29

An electron-donating chromatic organic compound (component A) as indicated in Table I, a compound having a phenolic hydroxyl group (component B) as indicated in Table I and a compound selected from the group consisting of higher aliphatic monatomic alcohols (component C) and higher aliphatic monatomic acid alcohol esters (component D), which is also indicated in Table I, were mixed together in the amounts indicated in Table I with or without an additive as indicated in Table I, under the conditions (temperature and agitation time) as indicated in Table I. Data on the metachromatic colors and metachromatism-causing temperatures are also shown in Table I.

The thermochromic material of the present invention is formed by heating the components to form a homogeneous solution. The electron-donating chromatic organic compound (component A) is a solid. The compound having a phenolic hydroxyl group (component B) can be a liquid or a solid. The compound(s) selected from the group consisting of higher aliphatic monatomic alcohols and higher aliphatic monatomic alcohol acid esters (component D) can also be a liquid or a solid. The order of mixing or heating is not important, and the components can be added or heated in any order to form a homogeneous solution, or can be separately heated and then mixed while melted to form a homogeneous solution. However, in this regard, one should not melt the electron-donating chromatic organic compound (A) by itself, because, generally speaking, these materials per se melt at a high temperature, and can decompose. Thus, practically speaking, component (A) will be mixed with one or both of components (B), (C) and (D) order to melt component (A). In fact, while the above discussion has made it clear that the order of mixing, melting, etc., is optional, as a manner of practice it is most simple to merely combine all three components together and melt them to form a homogeneous solution.

As soon as the homogeneous solution is formed, it can be cooled, if desired, for use. Generally speaking, however, after it appears the system has been dissolved to form a homogeneous solution, agitation at elevated temperature will be continued for a few minutes to make sure of complete homogeneity. In practice, the system is merely elevated to a temperature on the order of 70° – 90° C and agitated for about 10 minutes.

No advantage exists to conduct this operation at other than atmospheric pressure (which was the case in all Examples), though if one is disposed to operate at sub- or super- atmospheric pressures, this can be done. However, an unnecessary complexity is thus introduced into the fairly simple procedure of forming a homogeneous solution.

In Table I, the following abbreviations are used:
CVL: Crystal Violet lactone
PSD-V: 3-diethylamino-6-methyl-7-chlorofluoran
PSD-G: 3-diethylamino-5-methyl-7-dibenzylaminofluoran
PSD-O: 3-chloro-6-cyclohexylaminofluoran
PSD-P: 3-diethylamino-7,8-benzofluoran
Zu-P: di-$\beta$-naphthospiropyran
Orient B: phenylleucoauramine-n-bis-(dimethylaminophenyl)-2-amino-6-methylbenzothiazole Tradenames appearing in Table I indicate the following chemicals or products:
Phenol resin PP-810: phenylphenol resin of a m.p. of 75° – 90° C manufactured by Gunei Kagaku K. K., Japan
Sumilizer WX: 4,4'-thio-bis(6-tert-butyl-3-methylphenyl)
Tinuvin 327: 2-(3',5'-di-tert-butyl-2'-hydroxyphenyl)-5-chlorobenzotriazole
Vali Fast Yellow No. 3105: C.I. Solvent Yellow 21
Oil Blu BOS: C.I. Solvent Blue 25
Antigene W: 1,1-bis-(4-hydroxyphenyl)-cyclohexane
Lusmit: dilauryl thiodipropionate
Aizen Spilon Yellow GRH: C.I. Solvent Yellow 61
Sumilizer MDP: 2,2-methylene-bis-(6-tert-butyl-4-methyl phenol)
Sumilizer BBM: 4,4'-butylidene-bis-(6-tert-butyl-3-methyl phenol)

Table I

| Exp. No. | Component(A) (amount) | Component(B) (amount) | Component(C) (amount) | Component(D) (amount) | Additive (amount) |
|---|---|---|---|---|---|
| 1 | CVL (5)* | bis-phenol A (15) | docosyl alcohol (72) | stearyl stearate (8) | — |
| 2 | PSD-V (5) | bis-phenol A (15) | stearyl alcohol (64) | stearyl laurate (16) | — |
| 3 | PSD-P (4) | bis-phenol A (15) | cetyl alcohol (56) | stearyl caprate (25) | — |
| 4 | PSD-O (5) | bis-phenol A (10) | myristyl alcohol (50) | decyl myristate (35) | — |
| 5 | PSD-G (5) | Sumilizer WX (15) | lauryl alcohol (55) | octyl laurate (25) | — |
| 6 | PSD-P (3) | Sumilizer WX (10) | oleyl alcohol (44) | octyl caprate (43) | — |
| 7 | CVL (10) | Antigene W (15) | lauryl alcohol (52) | octyl caprate (23) | Tinuvin 327 (4) |
| 8 | Orient B (10) | bis-phenol A (10) | myristyl alcohol (55) | cetyl caprate (25) | — |
| 9 | PSD-V (10) | bis-phenol A (15) | stearyl alcohol (60) | stearyl stearate (15) | — |
| 10 | PSD-G (5) Y-1 (5) | bis-phenol A (10) | cetyl alcohol (64) | stearyl laurate (16) | — |
| 11 | Rhodamine B lactam (10) | Sumilizer WX (10) | oleyl alcohol (40) | butyl laurate (40) | — |
| 12 | CVL (5) | Antigene W (25) | stearyl alcohol (55) | lauryl stearate (15) | Vali Fast Yellow No. 3107 (0.04) |
| 13 | PSD-P (5) | bis-phenol A (15) Sumilizer BBM (10) | cetyl alcohol (50) | lauryl laurate (20) | Aizen Spilon Yellow GRH (0.04) |
| 14 | PSD-V (5) | bis-phenol A (25) | oleyl alcohol (35) | octyl caprylate (35) | Oil Blue BOS (0.04) |
| 15 | PSD-G (5) | Sumilizer WX (15) Sumilizer MDP (10) | myristyl alcohol (35) | cetyl myristate (35) | — |
| 16 | PSD-O (5) | Sumilizer WX (25) | lauryl alcohol (50) | butyl myristate (20) | Tinuvin 327 (4) |
| 17 | Rhodamin B lactam (10) | bis-phenol A (25) | myristyl alcohol (35) | decyl myristate (30) | Lusmit (4) |
| 18 | PSD-P (10) | cetyl gallate (25) | cetyl alcohol (50) | cetyl myristate (15) | — |
| 19 | PSD-G (5) Y-1 (5) | phenol resin PP-810 (22) | lauryl alcohol (40) | butyl laurate (28) | — |
| 20 | CVL (4) Y-1 (6) | bis-phenol A (12) Sumilizer MDP (10) | stearyl alcohol (55) | stearyl laurate (13) | — |
| 21 | PSD-V (10) | Antigene W (25) | oleyl alcohol (40) | decyl caprate (25) | — |
| 22 | PSD-P (1) | bis-phenol A (2) | docosyl alcohol (10) | 12-hydroxystearic acid triglyceride (87) | Tinuvin 327 (4) |
| 23 | CVL (3.5) | bis-phenol A (13.5) | stearyl alcohol (66) | stearyl laurate (17) | Aizen Spilon Yellow GRH (0.04) |
| 24 | PSD-P (3.5) | bis-phenol A (13.5) | myristyl alcohol (66) | decyl myristate (17) | Oil Blue BOS(0.04) |
| 25 | PSD-G (5) | bis-phenol A (10) | lauryl alcohol (60) | decyl caprate (25) | Tinuvin 327 (4) |
| 26 | CVL (3.5) | bis-phenol A (13.5) | oleyl alcohol (50) | decyl caprylate (23) | Vali Fast Yellow No. 3107 (0.04) |
| 27 | PSD-O (5) | bis-phenol A (10) | cetyl alcohol (68) | stearyl laurate (17) | Lusmit (4) |

Table I-continued

| Exp. No. | Component(A) (amount) | Component(B) (amount) | Component(C) (amount) | Component(D) (amount) | Additive (amount) |
|---|---|---|---|---|---|
| 28 | PSD-P (3.5) | bis-phenol A (13.5) | docosyl alcohol (66) | stearyl stearate (17) | Tinuvin 327 (4) |
| 29 | CVL (1.5) | bis-phenol A (2) | stearyl alcohol (10) | 12-hydroxystearic acid triglyceride (86.5) | Tinuvin 327 (4) |

*all parts are by weight

Properties of Thermochromic Material

| Exp. No. | Color at temperature below metachromatism temperature | Metachromatism temperature (° C) | Color at temperature above metachromatism temperature |
|---|---|---|---|
| 1 | blue | 51 ~ 56 (reversible) | colorless |
| 2 | red | 43 ~ 48 (reversible) | colorless |
| 3 | pink | 30 ~ 34 (reversible) | colorless |
| 4 | orange | 13 ~ 17 (reversible) | colorless |
| 5 | green | −7 ~ −1 (reversible) | colorless |
| 6 | pink | −28 ~ −23 (reversible) | colorless |
| 7 | blue | −7 ~ −3 (reversible) | colorless |
| 8 | blue | 23 ~ 28 (reversible) | colorless |
| 9 | red | 50 ~ 54 (reversible) | colorless |
| 10 | green | 35 ~ 39 (reversible) | colorless |
| 11 | red | −20 ~ −16 (reversible) | colorless |
| 12 | green | 44 ~ 50 (reversible) | yellow |
| 13 | red | 26 ~ 32 (reversible) | yellow |
| 14 | violet | −40 ~ −34 (reversible) | blue |
| 15 | green | 25 ~ 31 (reversible) | colorless |
| 16 | orange | 3 ~ 8 (reversible) | colorless |
| 17 | red | 15 ~ 19 (reversible) | colorless |
| 18 | pink | 34 ~ 40 (reversible) | colorless |
| 19 | green | −6 ~ −1 (reversible) | colorless |
| 20 | blue | 43 ~ 48 (reversible) | colorless |
| 21 | red | −8 ~ −4 (reversible) | colorless |
| 22 | pink | 40 ~ 45 (reversible) | colorless |
| 23 | green | 43 ~ 48 (reversible) | yellow |
| 24 | violet | 13 ~ 17 (reversible) | blue |
| 25 | green | −5 ~ 0 (reversible) | colorless |
| 26 | green | −25 ~ −21 (reversible) | yellow |
| 27 | orange | 34 ~ 38 (reversible) | colorless |
| 28 | pink | 51 ~ 56 (reversible) | colorless |
| 29 | blue | 40 ~ 45 (reversible) | colorless |

EXAMPLE 30

0.5 g of hexamethylene bis-chloroformate was dissolved in 30 g of the heated (at 80° C) thermochromic material obtained in Example 9, and the resulting mixture was added dropwise to 200 g of a 5% aqueous solution of gelatin and agitation was performed so that fine droplets were formed. A solution of 3 g of hexamethylene diamine in 50 g of water was gradually added to the above mixture being agitated, and the resulting mixture was agitated at about 50° C for 4 hours, whereby hexamethylene bischloroformate was reacted with hexamethylene diamine on the interface between the fine droplets of the thermochromic material and water to form a solid polyurethane insoluble in water and the thermochromic material. There were thus obtained microcapsules of the thermochromic material covered with polyurethane.

The microcapsules could be used as they were or after they had been subjected to post treatments such as filtration, centrifugal separation and drying. All of the microcapsules obtained in the following Examples could be similarly used as they were or after they had been subjected to post treatments such as mentioned above.

EXAMPLE 31

5 g of Epikote 834 (epoxy resin manufactured by Shell International Chemicals Co., U.S.A.; Bisphenol A diglycidyl polyether, (m.w. 450)) was dissolved in 30 g of heated (at 80° C) the thermochromic material obtained in Example 4, and the resulting mixture was added dropwise to 150 g of a 5% aqueous solution of gelatin and agitation was performed so that fine droplets were formed. A solution of 3 g of a curing agent, Epicure U (amine adduct of epoxy resin manufactured by Shell International Chemicals Co.) was gradually added to the above mixture being agitated, and the agitation was continued for about 4 hours while maintaining the liquid temperature at 80° C, whereby the Epikote 834 was reacted with the curing agent on the interface between the fine droplets of the thermochromic material and water to form a solid polymer insoluble in water and the thermochromic material. There were thus obtained microcapsules of the thermochromic material covered with solid polymer.

EXAMPLE 32

Using the thermochromic material obtained in Example 10, microcapsules of the thermochromic material were prepared in the same manner as described in Example 31.

EXAMPLE 33

Using the thermochromic material obtained in Example 16, microcapsules of the thermochromic material were prepared in the same manner as described in Example 31.

EXAMPLE 34

Using the thermochromic material obtained in Example 2, microcapsules of the thermochromic material were prepared in the same manner as described in Example 31.

EXAMPLE 35

1.0 g of Desmodul N-75 (polyisocyanate manufactured by Bayer A. G., Germany; triisocyanate (NCO content 15%, solids content 75%)) was dissolved in 30 g of the heated thermochromic material obtained in Example 25, and the mixture was added dropwise to 150 g of a 3% aqueous solution of Gohsenol GM-14 (polyvinyl alcohol (degree of saponification 86 – 89 mol%) manufactured by Nippon Gosei Kagau K. K., Japan) and agitation was performed so that fine droplets were formed. A solution of 2 g of a curing agent, Epicure T (amine adduct of epoxy resin manufactured by Shell International Chemicals) in 20 g of water was gradually added to the above mixture being agitated, and the agitation was continued for about 5 hours while maintaining the liquid temperature at 50° C, whereby the Desmodul N-75 reacted with the curing agent on the interface between the fine droplets of the thermochromic material and water to form a solid polyurea insoluble in water and the thermochromic material. There were thus obtained microcapsules of the thermochromic material covered with the so formed polyurea.

EXAMPLE 36

4 g of bis-phenol A was dissolved in 200 g a 0.8% aqueous solution of sodium hydroxide, and a solution formed by dissolving 3 g of terephthaloyl dichloride in 30 g of the heated thermochromic material obtained in Example 3 was added to the above solution and the mixture was agitated so that fine droplets of the thermochromic material were formed. In this manner, the agitation was continued for about 1 hour while maintaining the liquid temperature at 50° C, whereby terephthaloyl dichloride was reacted with bis-phenol A on the interface between the fine droplets of the thermochromic materials and water to form a solid unsaturated polyester insoluble in water and the thermochromic material. There were thus obtained microcapsules of the thermochromic material covered with the so formed unsaturated polyester.

EXAMPLE 37

6 g of monomeric styrene, 0.6 g of divinyl benzene and 10 mg of benzoyl peroxide were dissolved in 30 g of the heated thermochromic material obtained in Example 21. The resulting liquid mixture was added dropwise to 150 g of a 2% solution of gum arabic and agitation was performed so that fine droplets were formed. In this manner, the agitation was continued at about 60° C for 5 hours, whereby polymerization was allowed to proceed and a polymer insoluble in the thermochromic material and water was formed. There were thus obtained microcapsules of the thermochromic material covered with the insoluble polymer.

EXAMPLE 38

30 g of the thermochromic material obtained in Example 8, which was maintained at 80° C, was added dropwise to a solution of 15 g of Uramine P-1500 (urea-formalin precondensate (solids content 38%, specific gravity 1.16) manufactured by Mitsui Toatsu Kagaku K. K., Japan) in 135 g of water, and the resulting mixture was agitated so that fine droplets of the thermochromic material were formed. Citric acid was added to the mixture to lower the pH to 4, and the mixture was agitated for 5 hours at 45° – 50° C to form a polymer insoluble in the thermochromic material and water. There were thus obtained microcapsules of the thermochromic material covered with the insoluble polymer.

EXAMPLE 39

30 g of the thermochromic material obtained in Example 26, which was maintained at 80° C, was added dropwise to 80 g of a 5% aqueous solution of gelatin, and the resulting liquid mixture was agitated so that fine droplets of the thermochromic material were formed. Then, 80 g of a 5% aqueous solution of gum arabic was added to the mixture and the pH lowered to 5 by adding acetic acid under constant agitation. Then, 200 g of water was added to the mixture to cause coacervation and the pH was further lowered to 4.4. In order to harden the coacervated wall, 1 g of 37% aqueous formalin was added. Although the preceding operations were conducted at 50° C, at this point the temperature was lowered to 10° C and the pH was elevated to 9 and the system allowed to stand for several hours. There were thus obtained microcapsules of the thermochromic material.

EXAMPLE 40

Using the thermochromic material obtained in Example 18, microcapsules of the thermochromic material were prepared in the same manner as described in Example 39.

EXAMPLE 41

3 parts of the thermochromic material obtained in Example 22 was added to 100 parts of polyethylene and they were kneaded at 180° – 200° C by an extruder to obtain a thermochromic polyethylene.

EXAMPLE 42

4 parts of the thermochromic material obtained in Example 22 was added to 100 parts of polypropylene and they were kneaded at about 200° C by an extruder to obtain a thermochromic polypropylene.

EXAMPLE 43

3.5 parts of the thermochromic material obtained in Example 20 was added to 100 parts of polystyrene and they were kneaded at about 200° C by an extruder to obtain a thermochromic polystyrene.

EXAMPLE 44

4 parts of the thermochromic material obtained in Example 29 was aadded to a thermo-reactive hydrocarbon resin ECR-4 (hydrocarbon resin manufactured by Esso Chemicals Co., U.S.A.; thermal reactive type hydrocarbon resin (specific gravity 1.12, iodine value 185)), and they were kneaded at about 150° C by an extruder to obtain a thermochromic hydrocarbon resin.

EXAMPLE 45

5 parts of the thermochromic material obtained in Example 31 was added to 100 parts of polyethylene and they were kneaded at 160° – 180° C by an extruder to obtain a thermochromic polyethylene.

EXAMPLE 46

10 parts of the thermochromic material obtained in Example 32 was added to 100 parts of polymethyl methacrylate and they were kneaded at about 200° C by an extruder to obtain a thermochromic polymethyl methacrylate.

EXAMPLE 47

50 parts of Desmophen 800 (polyester manufactured by Bayer A. G., Germany (OH content 8.8%, specific gravity 1.14)) was mixed with 8 parts of the thermochromic material obtained in Example 35, and they were agitated to uniformly disperse the thermochromic material. Then, 50 parts of Desmodule L-75 (polyisocyanate manufactured by Bayer A. G., Germany; triisocynate (NCO content 13%, solid content 75%)) was added to the above mixture, and they were agitated and reacted at 80° for 5 hours to obtain a thermochromic polyurethane.

EXAMPLE 48

12 parts of the thermochromic material obtained in Example 31 was added to 90 parts of Epikote 828 (epoxy resin manufactured by Shell International Chemicals Co., U.S.A.; Bisphenol A diglycydyl polyether (m.w. 350 – 400)), and they were agitated to uniformly disperse the thermochromic material in the resin. Then, 10 parts of a curing agent, Epicure U (amine adduct of epoxy resin manufactured by Shell International Chemicals Co., U.S.A.) was added to the mixture. The resulting mixture was agitated and reacted at 60° C for 3 hours to obtain a thermochromic epoxy resin.

EXAMPLE 49

10 parts of the thermochromic material, obtained in Example 32 was added to 100 parts of an unsaturated polyester resin, and they were agitated to uniformly disperse the thermochromic material in the resin. Then, 0.5 part of methylethylketone peroxide and 0.2 part of cobalt naphthenate were added to the above mixture, and the resulting mixture was agitated and reacted at 80° C for 5 hours, to obtain a thermochromic, unsaturated polyester resin.

EXAMPLE 50

10.0 parts of the thermochromic material obtained in Example 3 was dissolved in 90.0 parts of heated (at 100° C) paraffin wax. The resulting ink had properties suitable as a cold-set ink.

EXAMPLE 51

30.0 parts of the thermochromic material obtained in Example 9 was dissolved in 70.0 parts of heated (at 100° C) paraffin wax. The resulting ink had properties suitable as a cold-set ink.

EXAMPLE 52

A mixture composed of 20.0 parts of the thermochromic material obtained in Example 20, 5.0 parts of Escorez 5000 (hydrogenated hydrocarbon resin manufactured by Esso Chemicals Co., U.S.A.; softening point 105° C, specific gravity 0.97), 50.0 parts of toluene and 25.0 parts of methyl-iso-butylketone was well agitated to dissolve the thermochromic material and the resin in the solvent. The resulting ink had properties suitable as a gravure ink.

EXAMPLE 53

20.0 parts of the thermochromic material obtained in Example 34, 50.0 parts of a 10% solution of casein in aqueous ammonia, 5.0 parts of a styrene-butadiene copolymer latex (having solids content of 50%) and 25 parts of water were well mixed to obtain a homogeneous mixture. The resulting ink had properties suitable as an aqueous gravure ink.

EXAMPLE 54

15.0 parts of the thermochromic material obtained in Example 12, 50.0 parts of a 20% solution of shellac in ethanol and 35.0 parts of propanol were mixed and agitated to uniformly dissolve the thermochromic material. The resulting ink had properties suitable as a gravure ink and a flexographic ink.

EXAMPLE 55

20.0 parts of the thermochromic material obtained in Example 31, 70.0 parts of a 5% aqueous solution of Metolozu 90SH (methyl cellulose manufactured by Shinetsu Kagaku K. K., Japan; methoxy content 19 – 24%) and 10 parts of Wallpol 9130 (vinyl acetate emulsion manufactured by Dainippon Ink Kagaku K. K., Japan (solids content 55%, specific gravity 1.08)) were blended and agitated to obtain a homogeneous mixture. The resulting ink had properties suitable as an aqueous screen ink.

EXAMPLE 56

20.0 parts of the thermochromic material obtained in Example 23, 70 parts of a 10% solution of Etoxy-200 (ethyl cellulose manufactured by The Dow Chemical Co., U.S.A.) in xylol and 10.0 parts of n-butyl acetate were agitated to dissolve the thermochromic material and resin. The resulting ink had properties suitable as an oily screen ink.

EXAMPLE 57

A mixture composed of 40.0 of the thermochromic material obtained in Example 31 and 60 parts of polymerized linseed oil was mixed with a drier composed of 0.1 part of cobalt naphthenate and 0.4 part of lead naphthenate. The resulting ink had properties suitable as a relief printing ink.

EXAMPLE 58

A mixture composed of 10 parts of microcrystalline wax, 5 parts of a low-molecular-weight polyethylene (having a molecular weight of 3,000) and 5 parts of the thermochromic material obtained in Example 1 was heated and rendered molten at 80 to 90° C for 15 minutes, and the melt was molded into a stick-like form to obtain a thermochromic crayon.

EXAMPLE 59

A mixture composed of 15 parts of a low-molecular-weight polyethylene (having a molecular weight of 5,000), 5 parts of glass bead (having a diameter of 5 to 30 $\mu$) and 5 parts of the thermochromic material obtained in Example 2 was molten and dispersed homogeneously at 80° to 90° C for 15 minutes, and the melt was molded into a column having a diameter of 2 mm to obtain a pencil lead. The resulting pencil lead was covered and protected with wood, paper or the like to obtain a thermochromic pencil.

EXAMPLE 60

A mixture composed of 20 parts of ethanol, 10 parts of xylol and 5 parts of the thermochromic material obtained in Example 10 was heated and rendered molten at 50° to 60° C for 15 minutes, and the resulting composition was filled in a marker to obtain a thermochromic writing instrument.

EXAMPLE 61

A mixture composed of 10 parts of Marlotherm S (mixture of isomers of triaryl-dimethane manufactured by Chemische Werke Huls A. G., Germany), 5 parts of dioctyl phthalate and 2 parts of Piccolyte Alpha (terpene resin manufactured by Esso Chemicals Co., U.S.A.; softening point 100° C, specific gravity 0.97) was heated at 80° to 90° C for 30 minutes under agitation to dissolve the piccolyte Alpha in the Marlotherms S and dioctyl phthalate, and 8 parts of the thermochromic material obtained in Example 19 was added to the above mixture. The resulting mixture was heated at 80° to 90° C for 15 minutes to dissolve the thermochromic material. The resulting ink composition was filled in a ball pen to obtain a thermochromic ball pen.

EXAMPLE 62

A mixture of 5 parts of Marlotherm S, 10 parts of linseed oil and 10 parts of the thermochromic material obtained in Example 18 was heated at 70° to 80° C for 20 minutes under agitation to obtain a thermochromic tube color.

EXAMPLE 63

A mixture composed of 10 parts of microcrystalline wax, 5 parts of n-paraffin wax (melting at 130° F) and 7 parts of the thermochromic material obtained in Example 32 was heated and rendered molten at 80° to 90° C for 10 minutes and the melt was molded into a stick-like form to obtain a thermochromic crayon.

EXAMPLE 64

30 parts of a 5% aqueous solution of Gohsenol GM-14, 40 parts of Wallpol 9130 and the thermochromic material obtained in Example 33 were mixed and agitated at room temperature to form a homogeneous mixture, which was suitable as a thermochromic tube color.

EXAMPLE 65

A mixture of 10 parts of microcrystalline wax, 5 parts of low-molecular-weight polyethylene (having a molecular weight of 1,500) and 5 parts of the thermochromic material obtained in Example 27 was heated and rendered molten at 80° to 90° C for 15 minutes, and the melt was molded into a stick-like form to obtain a thermochromic crayon.

EXAMPLE 66

A mixture of 50 parts of Sanwax 171P (low-molecular-weight polyethylene manufactured by Sanyo Kasei K. K., Japan), 20 parts of Elvax 420 (ethylene-vinyl acetate copolymer manufactured by Mitsui Polychemical K. K., Japan; vinyl acetate content 18%, ethylene content 82%) and 30 parts of the thermochromic material obtained in Example 2 was heated and rendered molten at 120° C for 15 minutes to obtain a homogeneous composition, which was useful as a thermochromic paint.

EXAMPLE 67

A mixture of 20 parts of Neowax A (low-molecular-weight polyethylene manufactured by Nisseki Jushi Kagaku K. K., Japan), 5 parts of Piccolyte Alpha (terpene resin manufactured by Esso Chemicals Co., U.S.A.), 65 parts of xylene and 10 parts of the thermochromic material obtained in Example 20 was heated and dissolved at 70° C for 30 minutes to obtain a thermochromic paint.

EXAMPLE 68

A mixture of 20 parts of Piccolyte Alpha, 40 parts of xylene, 30 parts of methyl-iso-butylketone and 10 parts of the thermochromic material obtained in Example 12 was heated and dissolved at 70° C for 20 minutes to obtain a thermochromic paint.

EXAMPLE 69

A mixture of 20 parts of Adeka Chlorinated Rubber (chlorinated rubber manufactured by Asahi Denka Kogyo K. K., Japan; chlorine content 68%; specific gravity 1.6), 40 parts of xylol, 25 parts of butyl acetate and 15 parts of the thermochromic material obtained in Example 8 was heated and dissolved at 60° C for 20 minutes to obtain a thermochromic paint.

EXAMPLE 70

A mixture of 80 parts of a 10% solution of Litron 820 (styrene-maleic anhydride copolymer manufactured by Mitsubishi Monsanto Kasei K. K., Japan; m.w. 20,000, acid number 180, equivalent weight 300) in aqueous ammonia and 20 parts of the thermochromic material obtained in Example 31 was agitatated at 30° C for 10 minutes to obtain a homogeneous dispersion, which was useful as a thermochromic paint.

EXAMPLE 71

50 parts of Wallpol 9130 (polyvinyl acetate emulsion manufactured by Dainippon Ink Kagaku K. K., Japan), 35 parts of water and 15 parts of the thermochromic material obtained in Example 34 were agitated at 30° C for 10 minutes to obtain a homogeneous dispersion, which was useful as a thermochromic paint.

EXAMPLE 72

30 parts of the thermochromic material obtained in Example 36 was added to a vehicle composed of 30 parts of a rosin-modified maleic resin and 40 parts of xylol and the mixture was agitated at 30° C for 10 minutes to obtain a homogeneous dispersion, which was useful as a thermochromic paint.

EXAMPLE 73

20 parts of the thermochromic material obtained in Example 33 was uniformly dispersed in 70 parts of Epikote 815 (epoxy resin manufactured by Shell International Chemicals; Bisphenol A diglycidyl polyether, m.w. 340 – 400) and Versamid (curing agent of the polyamide resin type manufactured by Daiichi General K. K., Japan) was added to the dispersion just before its use to obtain a thermochromic paint.

EXAMPLE 74

15 parts of a thermochromic material obtained in Example 40 was uniformly dispersed at 20° C into a vehicle composed of 15 parts of Denka Lac (vinyl chloride-vinyl acetate copolymer manufactured by Denki Kagaku K. K., Japan; vinyl chloride content 90%, vinyl acetate content 10%, degree of polymerization 450), 40 parts of methyl-iso-butylketone and 30 parts of xylene, to obtain a thermochromic paint.

EXAMPLE 75

The thermochromic polyethylene obtained in Example 41 was pulverized to a particle size of 50 to 200 μ. The thus pulverized product was useful as a thermochromic powder paint.

EXAMPLE 76

The thermochromic polypropylene obtained in Example 42 was pulverized to have a particle size of 50 to 200 μ. The thus pulverized product was useful as a thermochromic powder paint.

EXAMPLE 77

A printing ink composed of 20.0 parts of the thermochromic material obtained in Example 31, 70.0 parts of a 5% aqueous solution of Metolōzu 90SU and 10.0 parts of Wallpol 9130 was applied on portions of a backing liner composed of a synthetic paper by screen printing to form a thermochromic layer. A polyethylene film was laminated as a protective layer on the surface of the thermochromic layer to obtain a thermochromic sheet.

EXAMPLE 78

A printing ink composed of 10.0 parts of the thermochromic material obtained in Example 39, 75 parts of a 1% aqueous solution of polyvinyl alcohol and 15.0 parts of a styrene-butadiene latex (having a solids content of 50%) was coated on the entire surface of a backing liner paper by air knife coating to form a thermochromic layer. There was thus obtained a thermochromic sheet.

EXAMPLE 79

A printing ink composed of 20.0 parts of the thermochromic material obtained in Example 25, 70.0 parts of a 10% solution of ethyl cellulose in xylol and 10.0 parts of n-butyl acetate was applied on portions of a glass sheet as a backing liner by screen printing to form a thermochromic layer. A coating of polyvinyl butyral was applied as a protective layer on the surface of the thermochromic layer to obtain a thermochromic sheet.

EXAMPLE 80

A printing ink composed of 30 parts of the thermochromic material obtained in Example 2, 30 parts of microcrystalline wax and 4 parts of a low-molecular-weight polyethylene (having a molecular weight of 5,000) was printed on portions of a glass sheet as a backing liner with a heated intaglio method to form a thermochromic layer. Another glass sheet was then applied as a protective layer on the surface of the thermochromic layer to obtain a thermochromic sheet.

EXAMPLE 81

A printing ink composed of 20.0 parts of the thermochromic material obtained in Example 33, 60.0 parts of a 2% solution of casein in aqueous ammonia and 20.0 parts of a styrene-butadiene latex (having a solids content of 50%) was applied on portions of a cloth as a backing liner by aqueous gravure printing to form a thermochromic layer. There was thus obtained a thermochromic sheet.

EXAMPLE 82

A printing ink composed of 15.0 parts of the thermochromic material obtained in Example 20, 50.0 parts of a 20% solution of shellac in ethanol and 35.0 parts of propanol was applied on portions of a partially colored paper as a backing liner by gravure printing or flexographic printing to form a thermochromic layer. A polyvinyl chloride film containing an ultraviolet absorber such as Tinuvin 327 was laminated as a protective layer on the surface of the thermochromic layer to obtain a thermochromic sheet.

EXAMPLE 83

A composition of 5 parts of the thermochromic material obtained in Example 29 and 95 parts of polyethylene was kneaded at 180° C and formed a film-like article. It was then laminated on a partially colored paper to obtain a thermochromic sheet.

EXAMPLE 84

A composition composed of 8 parts of the thermochromic material obtained in Example 31 and 59 parts of polyethylene was kneaded at 160° C and molded into a film-like article. The film was then laminated on a partially colored paper to obtain a thermochromic sheet.

The thermochromic characteristics of the thermochromic materials obtaned in Examples 29 to 84 were determind to obtain results shown in Table II. In each of these thermochromic materials, metachromatism was found to be reversible.

Table II

| Exp. No. | Color at Temperature below Metachromatism-Causing Temperature | Metachromatism-Causing Temperature (° C) | Color at Temperature above Metachromatism-Causing Temperature |
|---|---|---|---|
| 30 | red | 50 ~ 54 (reversible) | colorless |
| 31 | orange | 13 ~ 17 (reversible) | colorless |
| 32 | green | 35 ~ 39 (reversible) | colorless |
| 33 | orange | 3 ~ 8 (reversible) | colorless |
| 34 | red | 43 ~ 48 (reversible) | colorless |
| 35 | green | −5 ~ 0 (reversible) | colorless |
| 36 | pink | 30 ~ 34 (reversible) | colorless |
| 37 | red | −8 ~ −4 (reversible) | colorless |
| 38 | blue | 23 ~ 28 (reversible) | colorless |
| 39 | green | −25 ~ 21 (reversible) | yellow |
| 40 | pink | 34 ~ 40 (reversible) | colorless |
| 41 | pink | 40 ~ 45 (reversible) | colorless |
| 42 | pink | 40 ~ 45 (reversible) | colorless |
| 43 | blue | 40 ~ 45 (reversible) | colorless |
| 44 | blue | 40 ~ 45 (reversible) | colorless |
| 45 | orange | 13 ~ 17 (reversible) | colorless |
| 46 | green | 35 ~ 39 (reversible) | colorless |
| 47 | green | −5 ~ 0 (reversible) | colorless |
| 48 | orange | 13 ~ 17 (reversible) | colorless |
| 49 | green | 35 ~ 39 (reversible) | colorless |
| 50 | pink | 30 ~ 34 (reversible) | colorless |

Table II-continued

| Exp. No. | Color at Temperature below Metachromatism-Causing Temperature | Metachromatism-Causing Temperature (° C) | Color at Temperature above Metachromatism-Causing Temperature |
|---|---|---|---|
| 51 | red | 50 ~ 54 (reversible) | colorless |
| 52 | blue | 43 ~ 48 (reversible) | colorless |
| 53 | red | 43 ~ 48 (reversible) | colorless |
| 54 | green | 44 ~ 50 (reversible) | yellow |
| 55 | orange | 13 ~ 17 (reversible) | colorless |
| 56 | green | 43 ~ 48 (reversible) | yellow |
| 57 | orange | 13 ~ 17 (reversible) | colorless |
| 58 | blue | 51 ~ 56 (reversible) | colorless |
| 59 | red | 43 ~ 48 (reversible) | colorless |
| 60 | green | 35 ~ 39 (reversible) | colorless |
| 61 | green | −6 ~ −1 (reversible) | colorless |
| 62 | pink | 34 ~ 40 (reversible) | colorless |
| 63 | green | 35 ~ 39 (reversible) | colorless |
| 64 | orange | 3 ~ 8 (reversible) | colorless |
| 65 | orange | 34 ~ 38 (reversible) | colorless |
| 66 | red | 43 ~ 48 (reversible) | colorless |
| 67 | blue | 43 ~ 48 (reversible) | colorless |
| 68 | green | 44 ~ 50 (reversible) | colorless |
| 69 | blue | 23 ~ 28 (reversible) | colorless |
| 70 | orange | 13 ~ 17 (reversible) | colorless |
| 71 | red | 43 ~ 48 (reversible) | colorless |
| 72 | pink | 30 ~ 34 (reversible) | colorless |
| 73 | orange | 3 ~ 8 (reversible) | colorless |
| 74 | pink | 34 ~ 40 (reversible) | colorless |
| 75 | pink | 40 ~ 45 (reversible) | colorless |
| 76 | pink | 40 ~ 45 (reversible) | colorless |
| 77 | orange | 13 ~ 17 (reversible) | colorless |
| 78 | green | −25 ~ −21 (reversible) | yellow |
| 79 | green | −5 ~ 0 (reversible) | colorless |
| 80 | red | 43 ~ 48 (reversible) | colorless |
| 81 | orange | 3 ~ 8 (reversible) | colorless |
| 82 | blue | 43 ~ 48 (reversible) | colorless |
| 83 | blue | 40 ~ 45 (reversible) | colorless |
| 84 | orange | 13 ~ 17 (reversible) | colorless |

The differences in the thermochromic characteristics between the thermochromic materials of this invention and the conventional thermochromic materials are summarized in Table III.

Table III

| | Thermochromic Materials of this Invention | Thermochromic Materials of the Metal Complex Type | Thermochromic Materials of the Liquid Crystal Type |
|---|---|---|---|
| Metachromatism-Causing Temperature | | | |
| −40 to 0° C | O (found) | X (not found) | Δ (a few found) |
| 0 to +40° C | O (found) | X (not found) | O (found) |
| +40 to +80° C | O (found) | Δ (a few found) | O (found) |
| Metachromatism Form color ⇌ colorless | O (found) | X (not found) | X (not found) |
| Selection of Metachromatic Colors and Combinations of Metachromatic Colors | O (freely possible) | X (impossible) | X (impossible) |
| Clarity in Metachromatism | O (good) | Δ (somewhat bad) | Δ (somewhat bad) |
| Reversibility between Light Transmitting and Light Shielding State | O (found) | X (not found) | X (not found) |
| Cost | O (cheap) | Δ (somewhat expensive) | X (expensive) |

As is seen from the foregoing description, the thermochromic materials of this invention have excellent metachromatic characteristics as compared to conventional thermochromic materials. Accordingly, the thermochromic materials of this invention can be effectively used in fields where conventional thermochromic materials are used, and, moreover, because of such novel metachromatic characteristics the thermochromic material of this invention can be utilized for new application fields where no conventional thermochromic materials have been used.

For instance, the thermochromic material of this invention can be effectively used for the detection of the temperature changes in various industries, especially industries involving low temperatures. It can also be used as a color-changing indicator for inspecting chemical reactions or indicating danger in a vessel or storage area for dangerous materials. Further, it can be used for the measurement of the temperature distribution in chemical equipment or as a temperature indicator for the early detection of heat generation caused by over-loads in electrical circuits or electrical machines. In addition to these industrial uses, the thermochromic material of this invention can be used as a temperature indicator for household articles such as a refrigirator, a food freezer, a cooler, a heating system, a bath and the like. Moreover, because of the property that color changes depending on various changes in the temperature can be used to hide or reveal a background, the thermochromic material of this invention can be used for display, exhibition and advertisement or as a teaching material, a toy, a magnet device or the like.

While the invention has been described in detail and with reference to specific embodiments thereof, it will be apparent to one skilled in the art that various changes and modifications can be made therein without departing from the spirit and scope thereof.

What is claimed is:

1. A reversible thermochromic material comprising (A) from about 1% to about 20% by weight of one or more electron-donating, chromatic organic compounds selected from the group consisting of diaryl phthalides, polyaryl carbinols, leuco auramines, lactum leuco compounds, indolines, spiropyrans and fluoranes having a molecular weight of from about 350 to about 1...; (B) from about 2% to about 30% by weight of one or more compounds having a phenolic hydroxyl group and a molecular weight of from about 200 to about 800; (C) from about 10% to about 90% by weight of one or more compounds selected from the group consisting of lauryl alcohol, myristyl alcohol, cetyl alcohol, stearyl alcohol, docosyl alcohol, oleyl alcohol and mixtures thereof; and (D) the balance to make 100% being one or more compounds selected from the group consisting of octyl caprylate, decyl caprylate, octyl caprate, decyl caprate, cetyl caprate, stearyl caprate, butyl laurate, octyl laurate, lauryl laurate, stearyl laurate, butyl myristate, decyl myristate, myristyl myristate, cetyl myristate, octyl palmitate, butyl stearate, decyl stearate, lauryl stearate, stearyl stearate, 12-hydroxy stearic acid triglyceride and mixtures thereof, said component (C) and (D) controlling the temperature and sensitivity of coloration/decoloration of said thermochromic material undergoing reversible metachromatism at a temperature within the range of from about −40° to about 80° C.

2. A thermochromic material as set forth in claim 1 wherein component (A) is selected from the group consisting of fluoran leuco compounds substituted with N-substituted amino groups, triphenyl methane phthalide leuco compounds and fluoran-γ-lactam leuco compounds 3. A thermochromic material as set forth in claim 1 wherein component (B) is selected from the group consisting of alkyl-monophenols, alkyl-diphenols, thio-bis-alkyl-phenols, alkylphenylphenols, alkylcatechols, hydroxyalkylnaphthalenes, dihydroxyalkylnaphthalenes wherein any alkyl moiety has 1 to 12 carbon atoms, gallic acid alcohol esters, p-oxybenzoic acid alcohol esters, protocatechuic acid alcohol esters and phenol-formaldehyde prepolymers.

4. A thermochromic material as set forth in claim 1 wherein the ratio of component (C) to component (D) is from about 9:1 to about 4:6 by weight.

5. A thermochromic material undergoing reversible metachromism at a temperature within the range of from about 40 to about 80° C, as set forth in claim 1 wherein component (C) controlling the temperature of coloration/decoloration of said thermochromic material is selected from the compounds consisting of docosyl alcohol, stearyl alcohol, cetyl alcohol and mixtures thereof, and component (D) controlling the sensitivity and the temperature of coloration/decoloration of said thermochromic material is selected from the compounds consisting of stearyl stearate, lauryl stearate, cetyl myristate, myristyl myristate, stearyl laurate, stearyl caprate, 12-hydroxy stearic acid triglyceride and mixtures thereof, wherein the ratio of compoent (C) to component (D) is from about 9:1 to about 4:6 by weight.

6. A thermochromic material undergoing reversible metachromism at a temperature within the range of from about 20° to about 40° C, as set forth in claim 1 wherein component (C) controlling the temperature of coloration/decoloration of said thermochromic material is selected from the compounds consisting of cetyl alcohol, myristyl alcohol and mixtures thereof, and component (D) controlling the sensitivity and the temperature of coloration/decoloration of said thermochromic material is selected from the compounds consisting of lauryl stearate, decyl stearate, butyl stearate, octyl palmitate, cetyl myristate, myristyl myristate, decyl myristate, stearyl laurate, lauryl laurate, stearyl caprate, cetyl caprate and mixtures thereof, wherein the ratio of component (C) to component (D) is from about 9:1 to about 4:6 by weight.

7. A thermochromic material undergoing reversible metachromism at a temperature within the range of from about 0 to about 20° C, as set forth in claim 1 wherein component (C) controlling the temperature of coloration/decoloration of said thermochromic material is selected from the group consisting of myristyl alcohol, lauryl alcohol and mixtures thereof, and component (D) controlling the sensitivity and the temperature of coloration/decoloration of said thermochromic material is selected from the group consisting of butyl stearate, octyl palmitate, decyl myristate, butyl myristate, lauryl laurate, octyl laurate, decyl caprate and mixtures thereof, wherein the ratio of component (C) to component (D) is from about 9:1 to about 4:6 by weight.

8. A thermochromic material undergoing reversible metachromism at a temperature within the range of from about −20 to about 0° C, as set forth in claim 1 wherein component (C) controlling the temperature of coloration/decoloration of said thermochromic material is selected from the group consisting of lauryl alcohol, oleyl alcohol and mixtures thereof, and component (D) controlling the sensitivity and the temperature of coloration/decoloration of said thermochromic material is selected from the group consisting of butyl myristate, octyl laurate, butyl laurate, decyl caprate, octyl caprate, decyl caprylate and mixtures thereof, wherein the ratio of component (C) to component (D) is from about 9:1 to about 4:6 by weight.

9. A thermochromic mateiral undergoing reversible metachromism at a temperature within the range of from about −40° to about −° C, as set forth in Claim 1 wherein component (C) controlling the temperature of coloration/decoloration of said thermochromic material is oleyl alcohol, and component (D) controlling the sensitivity and the temperature of coloration/decoloration of said thermochromic material is selected from the group consisting of butyl myristate, butyl laurate, octyl caprate, decyl caprylate, octyl caprylate and mixtures thereof, wherein the ratio of component (C) to component (D) is from 9:1 to about 4:6 by weight.

* * * * *

UNITED STATES PATENT AND TRADEMARK OFFICE
CERTIFICATE OF CORRECTION

PATENT NO. : 4,028,118
DATED : June 7, 1977
INVENTOR(S) : NORIKAZU KAKASUJI

It is certified that error appears in the above–identified patent and that said Letters Patent are hereby corrected as shown below:

In the first Table at column 4, after "oleyl alcohol", "-22∼-°C" should read --22∼-13°C--

Column 33, line 15, "about 1..." should read --about 1000--

Column 34, line 54, "about -°C" should read --about 20°C--

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*